Patented Oct. 23, 1951

2,572,300

UNITED STATES PATENT OFFICE 2,572,300

METAL MOLYBDITES AND THEIR PREPARATION

Herrick R. Arnold, Wilmington, and James E. Carnahan, New Castle, Del., assignors to E. I. du Pont de Nemours & Company, Wilmington, Del., a corporation of Delaware No Drawing. Application August 23, 1949, Serial No. 111,982

11 Claims. (Cl. 23—51)

This invention relates to new compositions of matter and to methods for their preparation. More particularly this invention relates to new chemical compositions containing molybdenum and to methods for preparing them.

It is an object of this invention to provide new compositions of matter. A further object is to provide new chemical compositions containing molybdenum and methods for their preparation. A still further object is to provide new chemical compositions containing molybdenum and having a relatively large surface area per unit of mass. Another object is to provide new catalytic compositions of matter. Other objects will appear hereinafter.

The objects of this invention are accomplished by the following new chemical compositions which are molybdites of metals whose ions are soluble in excess aqueous ammonia, that is whose ions are soluble in aqueous ammonia in amount greater than that stoichiometrically required to precipitate the metal ion. According to this invention there are provided new chemical compounds which are molybdites of those metals whose ions are not precipitated as insoluble oxides or hydroxides when solutions of their salts are treated with aqueous ammonia in amount slightly in excess of that which is theoretically required for the formation of the metal oxide or hydroxide. Some of these oxides and hydroxides are soluble in water as well as in excess aqueous ammonia.

The chemical compositions of this invention correspond by analysis to molybdites. These molybdites exist in two series, in the first of which the molybdenum is present in the quadrivalent state corresponding to the oxide $MoO_2$, and the hypothetical acid $H_2MoO_3$, while in the second series the molybdenum exists in the bivalent state corresponding to the oxide $MoO$ and the hypothetical acid $H_2MoO_2$. Examples of the two types are hereinafter described. Thus, the new compounds of this invention are molybdites of metals in which the metal Y is substituted for hydrogen in the acid formula $H_2MoO_n$ wherein $n$ is a whole number selected from the group consisting of 2 and 3, the ions of said metal Y forming by reaction with aqueous ammonia an oxide or hydroxide which is soluble in water or an oxide or hydroxide which is soluble in the presence of excess aqueous ammonia.

In actual practice these molybdites are obtained by reacting, in the presence of excess ammonia, stoichiometric proportions of ammonium molybdate with an aqueous ammonia soluble salt of the metal whose molybdite is desired, washing the precipitate which forms, filtering it, drying it and then calcining it for from 4 to 20 hours at 350 to 500° C. The calcined material in granular or powdered form is then reduced in a hydrogen-containing atmosphere for from 5 to 100 hours at gradually increasing temperatures ranging from room temperature up to 550° C., of which time at least one hour is at 550° C.

The examples which follow are submitted to illustrate and not to limit this invention.

Example I

Five liters of a 2 molar aqueous solution of ammonium molybdate [$(NH_4)_2MoO_4$] containing 1.5 moles excess ammonia was added to an equal volume of a 2 molar aqueous solution of zinc nitrate and the pH of the resulting slurry adjusted to 7 by addition of 670 cc. of 28% aqueous ammonia. The precipitated zinc amminomolybdate ($ZnMoO_4 \cdot NH_3 \cdot H_2O$) was washed with distilled water, filtered, dried and then calcined at 400° C. The calcination step converted the zinc amminomolybdate to the normal zinc molybdate ($ZnMoO_4$). The normal zinc molybdate thus obtained was reduced in hydrogen during 15–20 hours at temperatures starting at room temperature and increasing to a maximum of 550° C. in increments of 50° C. per hour, resulting in the formation of zinc molybdite. The reaction is as follows:

$$ZnMoO_4 + H_2 \rightarrow ZnMoO_3 + H_2O$$

The zinc molybdite is essentially insoluble in 10% hydrochloric acid and in 28% ammonia, whereas zinc amminomolybdate and zinc molybdate are almost completely soluble in these solvents. The reduction of the zinc molybdate to zinc molybdite also produces a ten-fold increase in surface area as shown below:

| | Spec. area, sq. m./gram [1] | Apparent density/ grams/100 cc. |
|---|---|---|
| Zinc molybdate | 2.4 | 1.54 |
| Zinc molybdite | 22.6 | 1.50 |

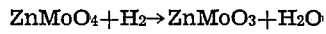

[1] Measurements were made according to the procedure described in a paper by P. H. Emmett, entitled "A New Method for Measuring the Surface Areas of Finely Divided Materials and for Determining the Size of Particles," Am. Soc. for Testing Materials, March 4, 1941, Symposium on New Methods for Particle Size Determination in the Sub-Sieve Range.

X-ray diffraction analysis of the zinc molybdite so prepared indicates this material to have a system of lines characteristic of a cubic crystal system. Analysis of the zinc molybdite indicated it to contain an average of 31.9% Zn and 44.8% molybdenum. The calculated values for ZnMoO₃ are 31.2% Zn and 45.4% Mo.

*Example II*

Five liters of a 2 molar solution of ammonium molybdate [(NH₄)₂MoO₄] containing 1.9 moles excess ammonia was added to an equal volume of 2 molar copper nitrate solution and the pH of the slurry which formed was adjusted to 7.0 by the addition of 620 cc. of 28% aqueous ammonia. The resulting precipitate was washed, filtered, and dried at 105° C. to 110° C. Analysis of the dry product showed it to contain 26.4% copper, 37.5% molybdenum and 6.0% ammonia. The calculated values for CuMoO₄.NH₃.H₂O are 24.6% copper, 37.1% molybdenum and 6.6% ammonia.

The copper amminomolybdate (CuMoO₄.NH₃.H₂O)

was calcined at 400° C. to convert it to copper molybdate. The copper molybdate was reduced with a 70%-30% nitrogen-hydrogen mixture, starting at room temperature and increasing the temperature stepwise in increments of approximately 50° C. per hour to 550° C., after which the nitrogen content of the mixed reducing gas was slowly reduced to zero and the reduction completed in pure hydrogen, at 550° C. during 17 hours. During the reduction step, two distinct exothermic reductions occurred at different temperature levels. The first took place at 260° to 300° C. and the second at 430° to 435° C. The low temperature reaction (i. e., that taking place at 260° to 300° C.) brought about only a slight thermal effect, the spontaneous but gradual temperature rise being of only about 10° to 20° C. The second exothermic effect occurred as the temperature reached 430° C. and it was comparatively intense, causing an abrupt rise in temperature to 460° C. within an interval of about 5 minutes. Analysis of the reduced product showed it to contain 33.9% copper and 46.5% molybdenum. The calculated values for CuMoO₃ are 30.7% copper and 46.3% molybdenum. The above analysis shows that the reduced product contained about a 3% excess of copper and this conforms with the fact that two distinct exothermic reductions were obtained at different temperature levels, the first and minor one occurring in the temperature range corresponding to the hydrogen reduction of free copper oxide.

X-ray diffraction analysis of the copper molybdite, prepared as described above, detected a low concentration of metallic copper, the major constituent however gave a series of lines which correspond to another cubic lattice.

*Example III*

Seventeen hundred sixty six grams of ammonium paramolybdate [(NH₄)₆Mo₇O₂₄.4H₂O], equivalent to 10 moles of MoO₃, was dissolved in 5000 cc. of distilled water and neutralized by the addition of 900 cc. of 28% aqueous ammonia. The resulting solution of ammonium molybdate [(NH₄)₂MoO₄] containing 1.9 moles excess ammonia was then added, with stirring, at room temperature to a solution of nickel nitrate, prepared by dissolving 2908 grams of nickel nitrate hexahydrate [Ni(NO₃)₂.6H₂O], equivalent to 10 moles of nickel, in 5000 cc. of distilled water. A pale green precipitate was formed in an acid slurry having a pH of approximately 4.0 by alkaline-acid paper. The pH of the slurry was adjusted to 7.0 (Beckmann pH meter) by the addition of 500 cc. of 28% aqueous ammonia. The precipitate was then washed, filtered, dried, and calcined at 400° C. for 18 hours. The calcined product, by analysis, was found to contain 23.2% nickel and 46.4% molybdenum.

The calcined product, prepared as described above, was reduced in hydrogen, at gradually increasing temperatures up to 550° C. The reduced product was highly pyrophoric and glowed on exposure to air. Analysis of the reduced material showed it to contain 26.66% nickel and 53.1% molybdenum corresponding to NiMoO₂.O.2MoO₃.

X-ray diffraction analysis of this product indicated that it was essentially non-crystalline.

*Example IV*

One liter of 2.0 molar ammonium molybdate [(NH₄)₂MoO₄] solution containing 0.3 mole of excess ammonia was added slowly and with stirring to 1 liter of 2.0 molar cobalt nitrate solution. The resulting slurry was adjusted to pH=7.0 by the addition of more aqueous ammonia and stirred for two hours. The precipitate was isolated by suction filtration. It was washed by decantation in a total of 19 l. of water, then dried overnight at 105° C., and finally calcined for 20 hours at 400° C. The purple product weighed 358 g. and analyzed correctly for cobalt molybdate; analysis: Found, Co=26.3%, Mo=43.9%; CoMoO₄ calc'd., Co=26.9%, Mo=43.8%.

Ninety-six grams of cobalt molybdate, prepared as above, was reduced by heating in hydrogen. In this step, the temperature was gradually raised so that in 5 hours it reached 425–450° C. whereupon a mildly exothermic reaction occurred. At this point water appeared in the exit gas and the reducing mass underwent rapid color change from purple to black. During the next two hours the temperature was held at 500° C., and then after water no longer was being evolved, it was set-up to 550° C. for a final period of 1.5 hours. The resulting cobalt molybdite weighed 93 g. and its analysis corresponded to CoMoO₃: Found, Co=29.1%, Mo=48.1%; calc'd. Co=29.1%, Mo=47.3%. Its surface area was 46.7 sq. meters per gram as measured according to the method set forth in Example I. By continuing the hydrogen treatment at 550° C. for longer periods, reduction proceeded beyond the CoMoO₃ stage but at a considerably slower rate. Thus, one to two days of treatment under these conditions was generally required for the reducing mass to be transformed into the next lower molybdite, CoMoO₂; analysis: Found, Co=29.6%, Mo=51.9%; calc'd. Co=31.5%, Mo=51.3%. Its surface area was 43.1 sq. meters per gram as measured according to the method set forth in Example I.

X-ray diffraction analysis of CoMoO₃ and CoMoO₂ detected no free cobalt or oxides of molybdenum. The CoMoO₂ was only slightly attacked by sulfuric acid during 60 hours on a steam bath.

As previously pointed out, the molydites of this invention are successfully prepared by carefully controlled reduction of the corresponding molybdate salts which are prepared by precipitation, in the presence of excess ammonia, by mixing suitable solutions of salts of the desired metal and ammonium molybdate.

Specific molybdites of this invention in addition to those exemplified are alkali metal molybdites such as sodium molybdite and lithium molybdite, silver molybdite, barium molybdite, magnesium molybdite, thorium molybdite, cadmium molybdite, mercury molybdite, manganese molybdite, aluminum molybdite, indium molybdite, germanium molybdite, tin molybdite, chromium molybdite, titanium molybdite, zirconium molybdite, and antimony molybdite.

In some cases it may be advantageous to prepare two or more molybdites simultaneously, thus obtaining them in intimate association, or to carry reduction of the molybdate salts to a point either somewhat beyond or before the precise molybdite stage or to employ a slight excess of one component in order to gain advantages in catalyst performance, such as, for example, enhanced activity or selectivity.

As a rule the calcination step is conducted at temperatures of from 350 to 500° C. for from 4 to 20 hours. Usually, however, the calcination is carried on for no less than 12 hours or for more than 24 hours.

The reduction of the calcined product is effected with hydrogen alone or with hydrogen admixed with a diluent gas such as nitrogen at gradually increasing temperatures from normal room temperature to 550° C. for from 5 to 100 hours, of which time at least one hour is at 550° C. Some variations in the composition of these molybdites may be effected by controlling the time and temperature of reduction but in any event the reduced products correspond essentially to a molybdite.

Although in the examples ammonium paramolybdate has been used and converted to the normal molybdate by addition of ammonia to a pH of 7, this is only because the ammonium paramolybdate is more readily available than the normal salt. If desired, however, the normal ammonium molybdate may be used and the neutralization step omitted.

Although in the examples the aqueous solution of the ammonium molybdate has been added to the aqueous solution of the salt of the metal whose molybdite is desired, there is nothing critical about this order of addition, and the salt solution may be added to the ammonium molybdate solution if desired.

Generally the reaction between the ammonium molybdate and the salt of the metal whose molybdite is desired is effected at ordinary temperatures. It is desirable that the mixing of the solutions be effected with good agitation in order to insure the best conditions for complete reaction. It is sometimes desirable to warm the mixed solutions in order to bring about coagulation of the precipitate formed and thus make it easier to handle in the subsequent washing and filtering operations.

The nitrates of copper, nickel, cobalt and zinc have been used in the examples. It is to be understood that in place of these, any aqueous ammonia soluble salt whose ions are not precipitated as insoluble oxides or hydroxides when solutions of their salts are treated with aqueous ammonia in amount slightly in excess of that theoretically required for the formation of the oxide or hydroxide may be used equally as well. Examples of such salts are sodium chloride, sodium sulfate, lithium chloride, lithium nitrate, barium nitrate, copper sulfate, copper chloride, nickel sulfate, nickel chloride, nickel acetate, thorium nitrate, thorium chloride, manganese chloride, indium chloride, zinc chloride, zinc sulfate, zinc permanganate, chromium nitrate, chromium chloride, titanium chloride, zirconium chloride, silver nitrate, silver fluosilicate, antimony chloride, antimony fluoride, magnesium chloride, magnesium sulfate, cadmium chloride, cadmium nitrate, mercuric nitrate, mercuric acetate, mercurous nitrate, aluminum nitrate, aluminum sulfate, aluminum formate, germanium iodide, stannous chloride, stannous fluoride, stannic sulfate, cobalt nitrate, cobalt chloride and the like. The ions of the metals of some of these salts, such as the alkali metals, form by reaction with aqueous ammonia oxides or hydroxides which are soluble in water as well as in excess aqueous ammonia.

The molybdites of this invention are particularly useful as catalysts, especially for isomerization, dehydrogenation, and dehydration reactions. They are especially useful as catalysts for the hydrogenation of olefin double bonds, e. g., in the hydrogenation of cyclohexene to cyclohexane.

The molybdite catalysts of this invention are uniquely useful for effecting molecular rearrangement reactions in organic compounds. Thus for example, when 1-octene is heated at 200° C. under autogenous pressure for three hours in the presence of cobalt molybdite there is obtained in 85% conversion a mixture of 2-, 3-, and 4-octenes and when ortho-xylene is contacted briefly with nickel molybdite at 500° C. there is obtained a mixture of meta- and para-xylenes.

As many apparently widely different embodiments of this invention may be made without departing from the spirit and scope thereof, it is to be understood that this invention is not limited to the specific embodiments thereof except as defined in the appended claims.

We claim:

1. A molybdite of a metal in which a metal Y is substituted for hydrogen in the acid formula $H_2MoO_n$ wherein $n$ is a whole number selected from the group consisting of 2 and 3, the ions of said metal Y forming by reaction with aqueous ammonia a compound selected from the group consisting of oxides and hydroxides which are soluble in the presence of excess aqueous ammonia, and oxides and hydroxides which are soluble in water.

2. A zinc molybdite having the formula $ZnMoO_3$.

3. A copper molybdite having the formula $CuMoO_3$.

4. A nickel molybdite having the formula $NiMoO_2$.

5. A cobalt molybdite having the formula $CoMoO_3$.

6. A cobalt molybdite having the formula $CoMoO_2$.

7. A method for the preparation of metal molybdites which comprises reacting ammonium molybdate in the presence of excess aqueous ammonia with an aqueous ammonia soluble salt of a metal, the ions of said metal forming by reaction with aqueous ammonia a compound selected from the group consisting of oxides and hydroxides which are soluble in the presence of excess aqueous ammonia, and oxides and hydroxides which are soluble in water, calcining at a temperature of 350 to 500° C. the precipitate formed by said reaction of ammonium molybdate in the presence of excess aqueous ammonia with said aqueous ammonia soluble metal salt, and reducing said precipitate with hydrogen at a temperature up to 550° C. until the metal molybdite is formed.

8. A process as set forth in claim 7 wherein said aqueous ammonia soluble salt of a metal is zinc nitrate and the metal molybdite is zinc molybdite.

9. A process as set forth in claim 7 wherein said aqueous ammonia soluble salt of a metal is copper nitrate and said metal molybdite is copper molybdite.

10. A process as set forth in claim 7 wherein said aqueous ammonia soluble salt of a metal is nickel nitrate and said metal molybdite is nickel molybdite.

11. A process as set forth in claim 7 wherein said aqueous ammonia soluble salt of a metal is cobalt nitrate and said metal molybdite is cobalt molybdite.

HERRICK R. ARNOLD.
JAMES E. CARNAHAN.

REFERENCES CITED

The following references are of record in the file of this patent:

UNITED STATES PATENTS

| Number | Name | Date |
|---|---|---|
| 1,964,000 | Lazier | June 26, 1934 |
| 1,964,001 | Lazier | June 26, 1934 |
| 2,018,680 | Lazier | Oct. 29, 1935 |
| 2,077,421 | Lazier | Apr. 20, 1937 |
| 2,116,552 | Arnold | May 10, 1938 |
| 2,418,309 | Matuszak | Apr. 1, 1947 |

OTHER REFERENCES

Mellor: "Comprehensive Treatise on Inorganic and Theoretical Chemistry," vol. 11, pages 526–529, 532, 540 (1931) Longmans, Green and Co., N. Y. C.

Hoffman, M. K.: Lexikon der Anorganischen Verbinsungen, Band II, Nos. 56–81, pages 646 and 648 (1912–1914).